US012095653B2

(12) United States Patent
Suri et al.

(10) Patent No.: US 12,095,653 B2
(45) Date of Patent: Sep. 17, 2024

(54) ROUTER ARCHITECTURE FOR MULTI-DIMENSIONAL TOPOLOGIES IN ON-CHIP AND ON-PACKAGE NETWORKS

(71) Applicant: Applied Materials, Inc., Santa Clara, CA (US)

(72) Inventors: Tameesh Suri, San Jose, CA (US); Bilal Shafi Sheikh, Sunnyvale, CA (US); Myron Shak, San Jose, CA (US); Naveed Zaman, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 82 days.

(21) Appl. No.: 17/348,183

(22) Filed: Jun. 15, 2021

(65) Prior Publication Data

US 2022/0400073 A1    Dec. 15, 2022

(51) Int. Cl.
*H04L 45/00* (2022.01)
*G06F 18/21* (2023.01)
(Continued)

(52) U.S. Cl.
CPC ............ *H04L 45/20* (2013.01); *G06F 18/217* (2023.01); *H04L 45/74* (2013.01); *H04L 47/122* (2013.01); *H04L 47/30* (2013.01)

(58) Field of Classification Search
CPC ....... H04L 45/20; H04L 45/74; H04L 47/122; H04L 47/30; G06F 18/217
(Continued)

(56) References Cited

U.S. PATENT DOCUMENTS 7,120,683 B2 * 10/2006 Huang .................... H04L 45/00
370/352
7,903,650 B2 * 3/2011 Zhao ...................... H04L 12/66
709/240
(Continued)

FOREIGN PATENT DOCUMENTS

CN        116340248 A   *  6/2023    .........  G06F 15/7825
CN        115277551 B   *  1/2024
(Continued)

OTHER PUBLICATIONS

Photonic Networks-on-Chip for Future Generations of Chip Multiprocessors Assaf Shacham; Keren Bergman; Luca P. Carloni IEEE Transactions on Computers Year: 2008 | vol. 57, Issue: 9 | Journal Article | Publisher: IEEE (Year: 2008).*
(Continued)

*Primary Examiner* — Melvin H Pollack
(74) *Attorney, Agent, or Firm* — Kilpatrick Townsend & Stockton LLP (57) ABSTRACT

A router may include input buffers that receive a packet being transmitted from a source to a destination, a state generator that determines a state for the packet, and a memory representing weights for actions corresponding to possible states. The memory may be configured to return an action corresponding to the state of the packet, where the action may indicate a next hop in the route between the source and the destination. The router may also include reward logic configured to generate the weights for the plurality of actions in the memory. The reward logic may receive a global reward corresponding to the route between the source and the destination, calculate a local reward corresponding to next hops available to the router; and combine the global reward and the local reward to generate the weights for the plurality of actions in the memory.

20 Claims, 8 Drawing Sheets

(51) Int. Cl.
*H04L 45/74* (2022.01)
*H04L 47/122* (2022.01)
*H04L 47/30* (2022.01)

(58) Field of Classification Search
USPC .......................................................... 709/238
See application file for complete search history.

(56) References Cited

U.S. PATENT DOCUMENTS

| | | | |
|---|---|---|---|
| 8,699,484 B2 * | 4/2014 | Ee ........................... H04L 45/58 |
| | | | 370/473 |
| 9,699,079 B2 * | 7/2017 | Chopra ................... H04L 45/74 |
| 10,205,651 B2 * | 2/2019 | Piecuch ................. H04L 67/142 |
| 10,355,975 B2 | 7/2019 | Sebexen et al. | |
| 10,397,097 B2 * | 8/2019 | Avci ......................... H04L 45/24 |
| 10,552,740 B2 * | 2/2020 | Alpert ...................... G06N 3/10 |
| 10,686,729 B2 * | 6/2020 | Sindhu ................... H04L 49/113 |
| 10,791,046 B2 * | 9/2020 | Sharif .................... H04L 45/125 |
| 10,911,261 B2 * | 2/2021 | Adler ...................... H04L 12/462 |
| 10,917,328 B2 * | 2/2021 | Jha ........................ H04L 45/306 |
| 10,924,385 B2 * | 2/2021 | Kumar ................... H04L 45/125 |
| 10,931,530 B1 * | 2/2021 | Rzehak ................. H04L 45/742 |
| 10,983,910 B2 * | 4/2021 | Rowlands .............. H04L 45/06 |
| 11,121,962 B2 * | 9/2021 | Michael ............. H04L 41/0895 |
| 11,290,395 B1 * | 3/2022 | Goldman ............. H04L 49/206 |
| 11,329,916 B2 * | 5/2022 | MeLampy ............ H04L 45/308 |
| 11,362,939 B2 * | 6/2022 | Brewer ................. H04L 45/586 |
| 11,398,972 B2 * | 7/2022 | Shen ..................... H04L 45/033 |
| 11,398,980 B2 * | 7/2022 | Bharadwaj ............ H04L 49/254 |
| 11,438,256 B1 * | 9/2022 | Barcelo Llado ...... H04L 45/123 |
| 11,489,788 B2 * | 11/2022 | Zheng ..................... H04L 12/44 |
| 11,563,687 B2 * | 1/2023 | Pelekhaty ............. H04L 47/122 |
| 11,595,302 B2 * | 2/2023 | Ramsland .............. H04L 45/745 |
| 11,658,922 B2 * | 5/2023 | Brewer .................. H04L 69/22 |
| | | | 370/389 |
| 11,706,127 B2 * | 7/2023 | Michael ................ H04L 45/745 |
| | | | 370/252 |
| 11,706,146 B1 * | 7/2023 | Joliveau ................. H04L 45/02 |
| | | | 370/230 |
| 11,757,764 B2 * | 9/2023 | Bataineh ................ H04L 47/30 |
| | | | 370/351 |
| 11,973,685 B2 * | 4/2024 | Bataineh ............. H04L 47/2483 |
| 2012/0144066 A1 * | 6/2012 | Medved ................. H04L 45/42 |
| | | | 709/242 |
| 2015/0052283 A1 * | 2/2015 | Ishii ..................... G06F 13/1621 |
| | | | 710/309 |
| 2015/0124819 A1 * | 5/2015 | Li .......................... H04L 45/122 |
| | | | 370/392 |
| 2018/0183728 A1 * | 6/2018 | Kumar ................... H04L 45/124 |
| 2019/0138948 A1 | 5/2019 | Janulewicz et al. |
| 2019/0280963 A1 * | 9/2019 | Michael ................ H04L 45/125 |
| 2020/0067637 A1 | 2/2020 | Wang et al. |
| 2021/0326275 A1 * | 10/2021 | Anirudhan .......... G06F 11/3034 |
| 2022/0067713 A1 * | 3/2022 | Tietz ....................... H04L 47/39 |
| 2022/0129325 A1 * | 4/2022 | Kim ....................... G06F 15/80 |
| 2022/0129769 A1 * | 4/2022 | Sawada ................. G06N 3/045 |
| 2022/0182977 A1 * | 6/2022 | Miao ..................... H04W 72/51 |
| 2022/0222513 A1 * | 7/2022 | Paramasivam ....... G06F 1/3237 |
| 2022/0374288 A1 * | 11/2022 | Kibardin ............... G06N 3/084 |
| 2023/0027585 A1 * | 1/2023 | Weng ................... H04L 45/745 |
| 2023/0244620 A1 * | 8/2023 | Kim ....................... G06N 3/063 |
| | | | 710/33 |
| 2023/0316057 A1 * | 10/2023 | Kim ....................... G06N 3/063 |
| | | | 706/15 |

FOREIGN PATENT DOCUMENTS

| | | | | |
|---|---|---|---|---|
| EP | 1775897 A1 * | 4/2007 | ............. H04L 12/28 |
| EP | 1560376 B1 * | 2/2009 | ......... G06F 15/7825 |
| GB | 2493710 A * | 2/2013 | ............. H04L 45/24 |
| JP | 2006331067 A | 12/2006 | |
| JP | 2017-142774 A | 8/2017 | |
| KR | 102032362 B1 | 11/2019 | |
| TW | 201211787 A1 | 3/2012 | |
| WO | WO-2010137572 A1 * | 12/2010 | ............. H04L 45/00 |

OTHER PUBLICATIONS

International Search Report and Written Opinion mailed on Aug. 31, 2022 in International Patent Application No. PCT/US2022/031139, 10 pages.

* cited by examiner

ROUTER ARCHITECTURE FOR MULTI-DIMENSIONAL TOPOLOGIES IN ON-CHIP AND ON-PACKAGE NETWORKS

TECHNICAL FIELD

This disclosure generally relates to a routing network on a package for connecting chiplets from different ecosystems using different protocols. More specifically this disclosure describes a scalable network-on-package (NoPK) with programmable interconnect bridges and a routing network for routing traffic between chiplets in 2D, 2.5D, and 3D topologies.

BACKGROUND

A chiplet is a modular integrated circuit that is specifically designed to work with other similar modular chiplets to form a larger, more complex processing system. This allows functional blocks to be divided up into different chiplets in a design to provide greater flexibility and modularity during the design process. In contrast to conventional monolithic integrated circuit (IC) designs, chiplet-based designs use smaller independent dyes that are connected together. Each chiplet may be specifically designed to perform individual functions, such as processing cores, graphic processing units, math coprocessors, hardware accelerators, and so forth. Chiplet-based designs also decrease the cost of manufacturing, as a larger die may be divided into smaller chiplets to improve yield and binning. With the increased cost and slowing of Moore's law, conventional monolithic chip development is also becoming less attractive, as chiplets are less expensive and exhibit faster time-to-market production. The emergence of a relatively new chiplet-based ecosystem is beginning to enable an alternative way to design complex systems by integrating pre-tested chiplet dies into a larger package.

SUMMARY

In some embodiments, a router may include a plurality of input buffers configured to receive a packet being transmitted from a source to a destination, a state generator configured to determine a state for the packet from a plurality of states, and a memory representing weights for a plurality of actions corresponding to the plurality of states. The memory may be configured to return an action corresponding to the state of the packet. The action may indicate a next hop in a route between the source and the destination. The router may also include reward logic configured to generate the weights for the plurality of actions in the memory. The reward logic may be configured to receive a global reward corresponding to the route between the source and the destination, calculate a local reward corresponding to next hops available to the router, and combine the global reward and the local reward to generate the weights for the plurality of actions in the memory.

In some embodiments, a method of determining next hops for packets received by routers may include receiving a packet being transmitted from a source to a destination at a router, determining a state for the packet from a plurality of states, receiving a global reward corresponding to the route between the source and the destination, calculating a local reward corresponding to next hops available to the router, combining the global reward and the local reward to generate weights for a plurality of actions corresponding to the plurality of states, determining an action corresponding to the state of the packet based on a weight for the state of the packet, wherein the action may indicate a next hop in a route between the source and the destination, and routing the packet to the next hop.

In some embodiments, a router may include a plurality of input buffers configured to receive a packet being transmitted from a source to a destination, and circuitry implementing a reinforcement learning algorithm that determines a state of the packet and selects a corresponding action indicating a next hop for the packet. The reinforcement learning algorithm may combine a global reward corresponding to the route between the source and the destination and a local reward corresponding to next hops available to the router. The router may also include a plurality of output buffers configured to receive the packet and route the packet to the next hop selected by the reinforcement learning algorithm based on the state of the packet.

In any embodiments, any and all of the following features may be implemented in any combination and without limitation. The router may also include an indirect bus connecting the plurality of input buffers to a plurality of output buffers. The indirect bus may not include a crossbar array. The router may be part of a Network on Package (NoPK), and the source and destination may include chiplets. The router may be part of a Network on Chip, and the source and destination comprise subsystems on a SoC. The memory may include a static random access memory (SRAM) storing Q-matrix for a Q-learning algorithm. Combining the global reward and the local reward to generate the weights for the plurality of actions my include using a weighted combination of the global reward and the local reward for each action. The global reward may include values that punish or reward next hops for routers based on an optimal path between the source and the destination. The local reward may include values that are updated to reflect a local bottleneck observed by the router. Combining the global reward and the local reward may cause a next hop for the packet to change to avoid a local bottleneck. The reinforcement learning algorithm may include a Q-learning algorithm. The reinforcement learning algorithm may update a weight assigned to the action based on a discount factor that weights long-run rewards versus immediate rewards. The reinforcement learning algorithm may update a weight assigned to the action based on a learning rate factor that weights a new weight versus a previous weight.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

As traditional monolithic-based designs become increasingly more expensive to manufacture, chiplets have emerged as a successful alternative in system architectures to improve yields, reduce the cost of manufacture, and improve the modularity of designs. Generally, a chiplet is not a package type, but is rather part of a packaging architecture. Each chiplet may include a separate die manufactured from a silicon wafer. Instead of forcing all the functionality of the system (e.g., the central processing unit (CPU), the memory, the graphic processing unit (GPU), various peripherals, etc.) to be manufactured on one large monolithic die, chiplet-based systems separate these functionalities out into separate dies that can then be packaged together to perform the same functionality. By making individual dies smaller, the yield and manufacturing costs are reduced for the overall system.

Figure 1:
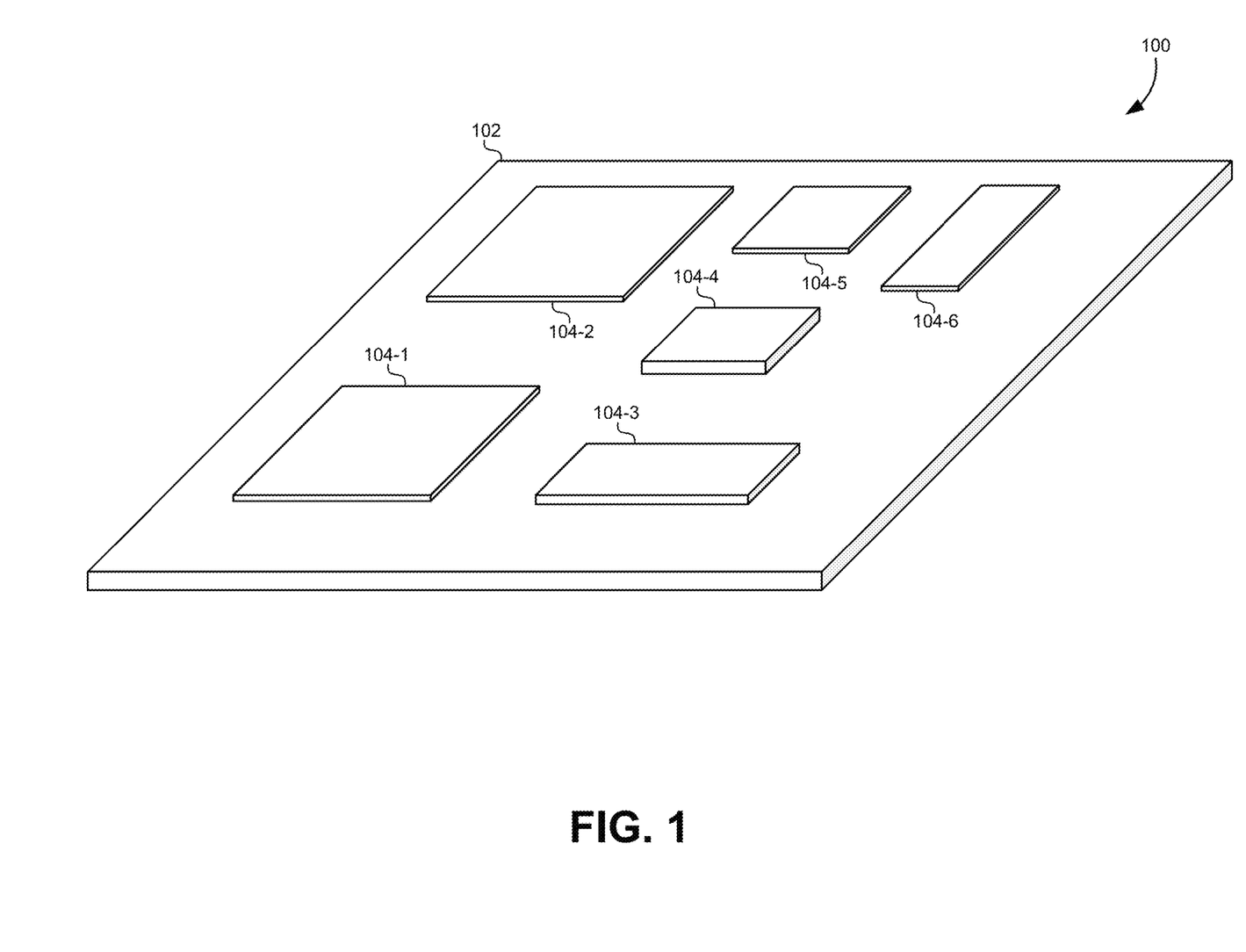
FIG. 1 illustrates a chiplet-based design, according to some embodiments.

FIG. 1 illustrates a chiplet-based system 100, according to some embodiments. A plurality of chiplets 104 may be manufactured as separate dies from one or more silicon wafers. The chiplets 104 may include a plurality of different functions, such as application-specific systems-on-a-chip (SOCs), a GPU, a digital signal processor (DSP), an artificial intelligence (AI) accelerator, various codecs, Wi-Fi communication modules, memory controllers, caches, input/output (I/O) peripherals, and so forth. Although manufactured on separate dies, each of these chiplets 104 may be connected together using various options to perform substantially the same functions as would be performed by a similar monolithic design, but in a distributed manner.

Although a chiplet-based system improves yield and manufacturing costs, such designs also greatly complicate the communication between different subsystems. On a monolithic design, these subsystems may communicate using a unified bus architecture, or a network-on-a-chip (NoC) fabric to pass information between the subsystems. However, when separating these subsystems out onto separate chiplets 104, the routing between the chiplets 104 must be separately considered for each design and arrangement of chiplets. In order to network the various chiplets 104 together, the chiplet-based system 100 typically must be co-designed and manufactured as a unified design. In other words, the type and physical arrangement of the chiplets 104 must first be established before the routing network can be designed and implemented. This greatly limits the scope of chiplet-based designs. As a result, most modern chiplet-based designs are designed and manufactured by a single entity using architectures from a single chip ecosystem (e.g., ARM, ARC, x86), with unified communication protocols (e.g., PCIe, CCIX/CXL, AXI, AMBA, etc.). Thus, current chiplet-based designs typically do not readily allow for interoperability between different chip ecosystems and different protocols, which prevents the system designer from using the full range of chiplets that may be available to implement the design. Instead, the system designer is limited to chiplets that are co-designed within a single communication framework and ecosystem.

For example, one chip manufacturer uses a proprietary system interconnect architecture that facilitates the data and control transmission across a chiplet-based architecture. However, while this fabric supports up to eight CPU complexes and may be implemented in 2D packaging, it is not compatible with office-the-shelf chiplets. Furthermore, this fabric includes a single arbitration point, and is thus not able to scale with chiplet systems of various sizes. Another chip manufacturer has implemented a 3D-based chiplet architecture that uses Through-Silicon Vias (TSVs). In this design, the top-level die comprises a monolithic compute die with several functional blocks, including a CPU, GPU, memory controller, etc. A bottom die includes I/O blocks using PCIe. The top and bottom dies are connected using the TSVs. While these architecture results in reduced wire lengths and lower power compared to the 2D approach, it requires co-designing the bottom die and the top die such that the TSVs align and are connected to the correct functional blocks. This prevents these dies from being used independently and requires a specific TSV-based interconnect to be designed for each iteration of the system. Neither of these solutions are compatible with scalable, off-the-shelf designs that use chiplets from various sources.

Some embodiments described herein may use a scalable interconnect that is manufactured independently on its own die. The solution is referred to herein as a "Network on Package" (NoPK), and may be designed as a dedicated die, package, or chiplet to be integrated with other chiplets in a scalable system. The NoPK connects and facilitates communication across various off-the-shelf chiplets. Compared to the existing designs, the NoPK layer is a general-purpose scalable fabric that can work with off-the-shelf chiplets from various ecosystems. The NoPK can be implemented using TSVs, using a 2D approach, and using a 3D approach with vertical interconnects. Furthermore, the NoPK supports multiple protocols using interface bridges to facilitate communication between different chiplet types.

Figure 2:
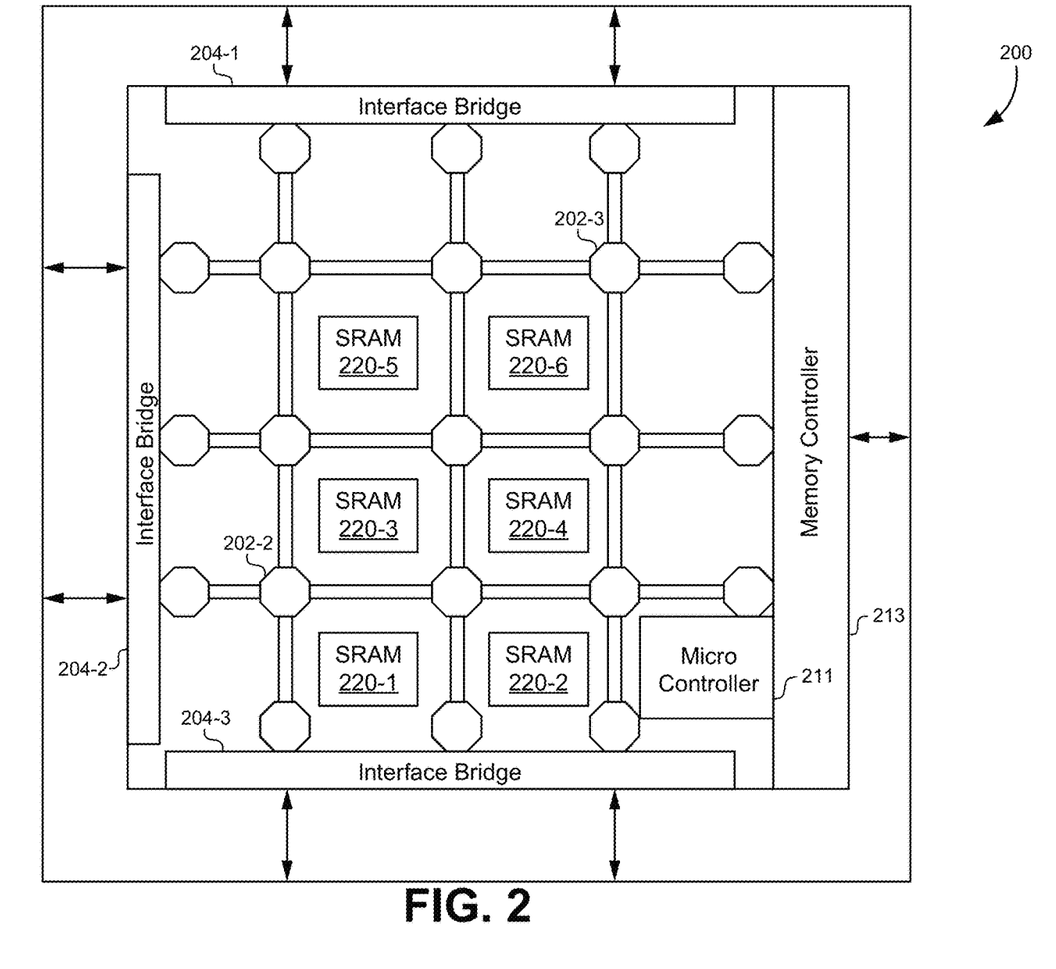
FIG. 2 illustrates a simplified block diagram of a network-on-package (NoPK), according to some embodiments.

FIG. 2 illustrates a simplified block diagram of a NoPK 200, according to some embodiments. The NoPK 200 maybe a digital architecture that can be implemented to fit any combination of chiplets. This digital architecture may be implemented on a dedicated die and may be considered its own chiplet or package. Thus, the NoPK 200 may be physically separate from any of the surrounding chiplets that make up the chiplet-based system. The block diagram of the NoPK 200 illustrated in FIG. 2A may be scaled as needed to meet the demands of chiplet-based systems of any size. For example, before the NoPK 200 is "taped out," the design may add additional routing hops, interface bridges, microcontrollers, memory modules, memory controllers, and so forth, as may be required by the particular design. Therefore, the NoPK 200 illustrated in FIG. 2A is provided only by way of example and is not meant to be limiting. It will be understood that other implementations may include more or fewer interface bridges, controllers, router hops, memories, etc., without restriction. The features described below may be applied to implementations of the NoPK 200 of any size or component count.

The NoPK 200 may include one or more interface bridges 204. The interface bridges are provided in order to convert the various protocols that may be used by the surrounding chiplets into a common protocol such that chiplets from different manufacturers may communicate with each other. Each of the interface bridges 204 may be programmed to receive any of the available communication or bus protocols that may be available in the chiplet marketplace. In general, the interface bridges 204 may support different protocols and enable dies or chiplets from different ecosystems and manufacturers to be used in a single unified design. For example, these protocols may include PCIe, CCIX, CXL, AXI, AMBA, etc.

The interface bridges 204 may be programmed to receive any of the available protocols and convert that protocol into a unified protocol that is used by the NoPK 200. As used herein, the communications and transmissions between chiplets that are received and/or routed through the NoPK 200 are generally referred to as "traffic." Traffic may include any signals, including power signals, communication signals, data signals, memory requests, and/or other electronic transmissions that may be received by the NoPK 200. For example, the interface bridges 204 may receive PCIe traffic from a microprocessor at interface bridge 204-1. Interface bridge 204-1 may convert the PCIe traffic into a general packetized format and route the converted packets through the routing network of the NoPK 200 to interface bridge 204-3. This may include a generic packet protocol that is not used by any of the other chiplets in the design. Interface bridge 204-3 may then convert the general packetized format into an AXI format to communicate with a Wi-Fi module of another chiplet.

In some embodiments, the interface bridges 204 may convert incoming traffic into one of the protocols used by the incoming traffic. In the example above, interface bridge 204-1 may receive the PCIe traffic from the microprocessor and simply pass the PCIe traffic into the routing network. The routing network of the NoPK 200 may use PCIe as its internal communication protocol. When the PCIe traffic is received by interface bridge 204-3, it may be converted into the AXI format to communicate with the Wi-Fi module of the other chiplet. These embodiments do not require any specialized or generic packet format or protocol, but may instead use one of the protocols of the surrounding chiplets.

In the example of FIG. 2A, the interface bridges 204 are arranged on three sides of the NoPK 200. Other embodiments may further place interface bridges 204 along one, two, or four sides of the NoPK 200, depending upon the connection requirements and orientation of the surrounding chiplets. As will be described below, orienting the interface bridges 204 along the periphery of the NoPK 200 allows vertical interconnects from layers above and/or below the NoPK layer. Alternatively, 2D implementations may also receive traces from neighboring chiplets at the periphery of the NoPK 200 through the interface bridges 204.

The NoPK 200 may include an internal routing network that includes a plurality of internal routers or hops that direct the traffic received from the interface bridges 204. Continue with the example above, when the PCIe traffic is received at interface bridge 204-1 and converted into a general packet format, these packets may be passed through the internal routing network through the router hops 202 until the traffic reaches interface bridge 204-3 where it can be translated into AXI and passed to the Wi-Fi chip.

The NoPK 200 may also include a controller 211. The controller 211 may be implemented using a microcontroller, a microprocessor, an FPGA, and/or any programmable logic device or processor configured to execute instructions. The controller 211 may program the interface bridges 204 and/or the routing network according to the needs of the surrounding chiplets. This allows the NoPK architecture to be flexible enough to adapt to different chiplet ecosystems and communication protocols. It also allows the NoPK architecture to scale to meet the needs of any number of chiplets. For example, the controller 211 may read/write configuration registers in the interface bridges 204 that control the protocol conversions. The controller 211 may also read/write configuration registers in the routing network that control connections between the interface bridges 204.

Continuing with the example above, the controller 211 may write a configuration value to a configuration register in interface bridge 204-1. This may cause interface bridge 204-1 to translate traffic received from the microprocessor from PCIe into a common protocol used in the routing network. The controller 211 may also write values to configuration registers that cause traffic received at interface bridge 204-1 from the microprocessor to be routed to interface bridge 204-3. This may cause packets sent from interface bridge 204-1 to be addressed to a specific port or location on interface bridge 204-3. The controller 204 may additionally write a configuration value to interface bridge 204-3 that causes traffic received internally from interface bridge 204-1 to be converted into AXI and sent to the Wi-Fi module of the external chiplet.

In addition to programming the interface bridges and/or the routing network based on the types of chiplets connected to the NoPK 200, the controller 211 may also read/write configuration registers at the router hops 202 to enforce a QoS policy on the traffic through the routing network. For example, the configurability provided by the controller 211 may allow the router hops 202 to prioritize traffic to/from specified external chiplets. Continuing with the example above, the traffic routed through the NoPK 200 from the microprocessor chiplet to the Wi-Fi module chiplet may be prioritized by the router hops 202 over communication between a chiplet implementing a GPU and a chiplet implementing a display driver. Thus, the controller 211 may program the routing network to prioritize traffic between a pair of chiplets in the design, traffic to/from a particular chiplet in the design, traffic of a particular type between any chiplets in the design, and so forth.

The controller 211 may therefore program the configuration registers of the NoPK 200 based on the types of chiplets connected to the NoPK 200. The types of chiplets may dictate the protocols that are used by the interface bridges and the corresponding configuration values that control how the interface bridges convert the various available protocols. The types of chiplets may also dictate the frequency/voltage used by the chiplets, and the configuration registers may be programmed such that the interface bridges properly interface with the chiplets. Additionally, the types of chiplets and their individual connections to the NoPK may be used to program the configuration registers for the routing network to route traffic between the different chiplets in the system.

The controller 211 may also include a telemetry engine that monitors traffic and operations performed by the chiplets and reports back a unified view of data processed by the chiplet-based system. The controller 211 may sample and/or record any of the traffic that passes through the routing network. The controller 211 may also capture data from any of the chiplets in the platform package by, for example, reading performance registers associated with any of the chiplets. The controller 211 may then store the telemetry data in an on-board memory, in an off-board memory through the memory controller 213, or transmit the telemetry data to an external device. For example, the controller 211 may transmit the telemetry data through the interface bridges 204 through a bus connection to a monitoring computer system outside of the chiplet-based system. Alternatively, the controller 211 may transmit the telemetry data through the interface bridges 204 to a chiplet with a Wi-Fi module that transmits the telemetry data to a monitor system. Other embodiments may store the telemetry data in SRAM modules of the NoPK 200 such that the telemetry data may be downloaded and/or transmitted when needed. This allows end-users to obtain a unified view of data and understrand/address any bottlenecks that may occur in the traffic passing through the NoPK 200 and/or in the operations of the surrounding chiplets.

In some embodiments, the controller 211 may also program additional configuration registers to control power management of the NoPK 200. For example, the controller 211 may shut down one or more of the router hops 202 when traffic falls below a threshold level in the routing network. The controller 211 may also shut down one or more of the router hops 202 for designs that use less than a threshold number of external chiplets. This allows the controller 211 to optimize the power used by the NoPK 200 and tailor this power consumption to the needs of the chiplet-based system as a whole. The controller 211 may also be configured to turn on/off the interface bridges 204 and/or portions of the interface bridges 204 as needed based on the real-time demands of the surrounding chiplets. For example, if a Wi-Fi chiplet is only active for a 100 ms window every five seconds, the corresponding interface bridge 204-3 connected to the Wi-Fi chiplet may be shut down between transmission windows.

The controller 211 may also program the interface bridges 204 and/or routing network to be compatible with different levels of dynamic voltage and frequency scaling (DVFS) used by different chiplets in the chiplet-based system. For example, various chiplets may use different voltage and/or frequency scaling to adjust the amount of power and the speed settings used by the individual chiplets. The controller 211 may program the interface bridges 204 to operate at different frequencies and/or at different voltages to correspond to the DVFS settings of the connected chiplet. Because the chiplets may adjust their DVFS settings during operation, it should be understood that the controller 211 can program the interface bridges 204 and/or routing network during operation. For example, the controller 211 may initially program the interface bridges 204 and/or routing network after the NoPK 200 is physically connected to the plurality of chiplets during manufacturing. The controller 211 may also dynamically program the interface bridges 204 and/or routing network during operation as the NoPK 200 is receiving and routing traffic from the chiplets.

Some embodiments may use a configurable memory hierarchy. These implementations may additionally include a memory controller 213. The memory controller 213 may be accessible through the NoPK 200 and available for any of the connected chiplets. The memory controller 213 may be communicatively coupled to a memory device that is external to the NoPK 200. For example, one of the surrounding chiplets may include in SRAM that is accessible through the memory controller 213.

Additionally, the NoPK 200 may include distributed SRAM modules 220 located in spaces between lanes of the routing network as depicted in FIG. 2B. These SRAM modules 220 may be configured as caches or software-managed buffers. The SRAM modules 220 may be configurable by the controller 211. The SRAM modules 220 may support the chiplet-based system as caches, which may be directly memory mapped. The controller 211 may configure the SRAM modules 220 to implement various eviction/replacement policies, such as Least Recently Used (LRE), First In First Out (FIFO), and/or any other cache policy. This allows the controller 211 to use the SRAM modules 200 as an adaptable memory hierarchy that can be configured during use for different use cases and workloads provided by the chiplets.

Figure 3:
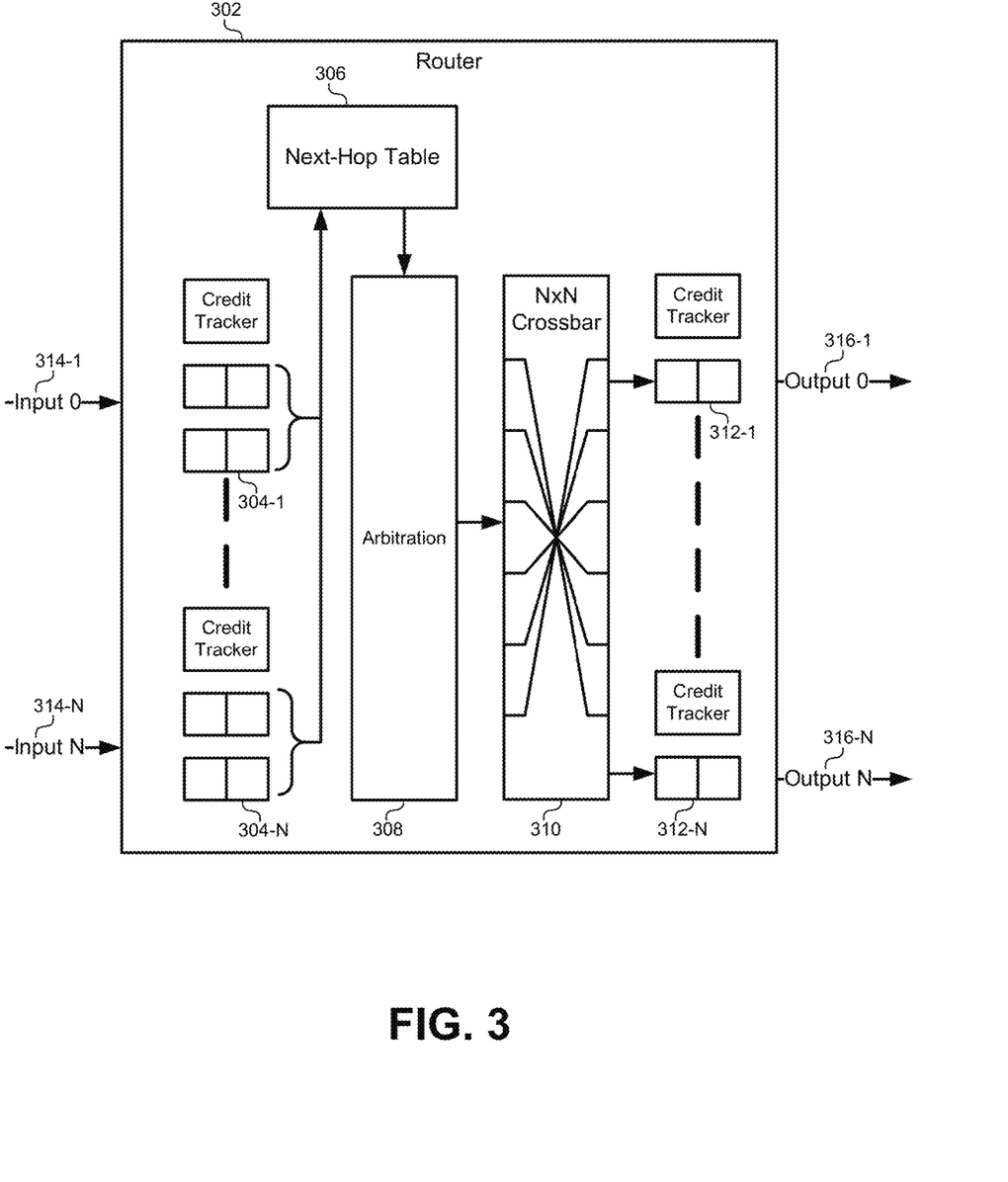
FIG. 3 illustrates an embodiment of a router that may be used in the routing network, according to some embodiments.

FIG. 3 illustrates an embodiment of a router 302 that may be used in the routing network, according to some embodiments. This router 302 may be used in the NoPK 200 described above in FIG. 2. However, other embodiments may use this router 302 in Network-on-Chip (NoC) implementations as well. An NoC may include a network-based communication subsystem on an integrated circuit that facilitates communications between modules in a system-on-a-chip (SoC). Various topologies used in different NoC implementations may use routers to route communications through the different subsystems on the chip. More broadly, unless specified otherwise, the router 302 may be used in any communication system where routers are used to transmit packets between endpoints.

The router 302 may include a plurality of inputs 314. These inputs 314 may be associated with physical channels that link the router 302 to surrounding routers, chiplets, and/or SoC subsystems. Each physical channel may be linked to one or more virtual channels 304. The virtual channels 304 may include multiple buffers that can share a physical channel. Each of the virtual channels 304 may include a credit tracker that monitors availability of the upstream and/or downstream routers connected to the corresponding physical channel.

When a packet is received on one of the inputs 314 and fills one of the corresponding virtual channels 304, the packet header may be read by a next-hop table 306 to determine a next hop in the routing sequence. For example, the header may include a destination address corresponding to a chiplet, etc., connected to the routing network. The next-hop table 306 may include a lookup table that has an entry for each possible destination. Each destination may be associated with an address referred to as a "next hop" that identifies one of the other routers connected to the router 302 to which the packet should be next sent.

The next-hop table 306 may generate an address for a subsequent router in the routing sequence to the destination location. The selected next hop may result in a collision or contention over resources in the router 302. For example, two-dimensional (2D) routers may include inputs/outputs on the four cardinal directions of the router 302, such as North, South, East, and West. When a number of next hops are assigned to a same direction, such as East, there may not be enough virtual channels 312 and/or physical channels corresponding to outputs 316 to accommodate all of the packets being routed. Therefore, arbitration logic 308 may handle arbitrating the conflicts between output locations. For example, the arbitration logic 308 may cause some packets to be delayed or may cause packets to be routed through different virtual channels where more bandwidth is available.

When a next hop is assigned and any arbitration is completed, the packet may be routed through an internal crossbar array 310. Note that this internal crossbar array 310 should be distinguished from the network array on the package or chip described above in FIG. 2. This crossbar array 310 is internal to the router and serves to connect the inputs 314 to the various outputs 316 in each of the directions. The crossbar array may be a matrix of switches, and the dimension of the crossbar array 310 may be determined by the number of channels in each direction. For example, in a 2D environment, the crossbar array 310 may include a 4×4 or 5×5 rectangular array corresponding to 4 or 5 channels in each direction. Each of the outputs 316 may be associated with corresponding virtual channels 312 that link multiple buffers to a single physical channel on the output 316. Note that some embodiments may use bidirectional channels that can alternate between inputs and/or outputs.

Traditional routers 302 may present a number of performance bottlenecks when the number of devices on a chiplet package or SoC continues to scale upwards. For example, the next-hop table 306 must grow with every device or chiplet added to the system. Similarly, as the number of possible destinations increases, the arbitration logic 308 used to resolve collisions increases in complexity. Additionally, chiplet packages may now be realized in a full 3D topology, which increases the number of external directions from four to six when adding a Up/Down direction to the routing possibilities. As the number of cardinal directions increases out of the router 302, the crossbar array 310 grows exponentially. Statistically, the crossbar array 310 uses the largest area on the die of the router 302 and uses the most energy and grows exponentially with the size of the network. Therefore, the traditional router 302 is unable to effectively scale with the increased complexity of chiplet packages.

The embodiments described herein solve these technical problems by proposing a new router architecture that replaces the next-hop table 306 and the arbitration logic 308 with a reinforcement learning algorithm that dynamically determines a next hop in the router based on global and local considerations. The reinforcement learning matrix may be updated with each routing decision using a global "reward" that corresponds to the overall route between the source and the destination of the packet. The system may also consider a local "reward" that corresponds to the immediate delays or other effects observed in the router 302 itself. By combining these two reward types, the reinforcement learning algorithm may make efficient routing decisions based on both local and global conditions. The learning matrix that stores actions for corresponding states may be statically sized such that it can scale very efficiently as the number of devices and/or ports on the router increase. Some embodiments may also replace the crossbar array 310 with a simple indirect connection topology, such as a bidirectional bus. Because the reinforcement learning algorithm can learn the availability of the indirect bus, it can be used more efficiently than the crossbar array 310 to achieve the same throughput.

Figure 4:
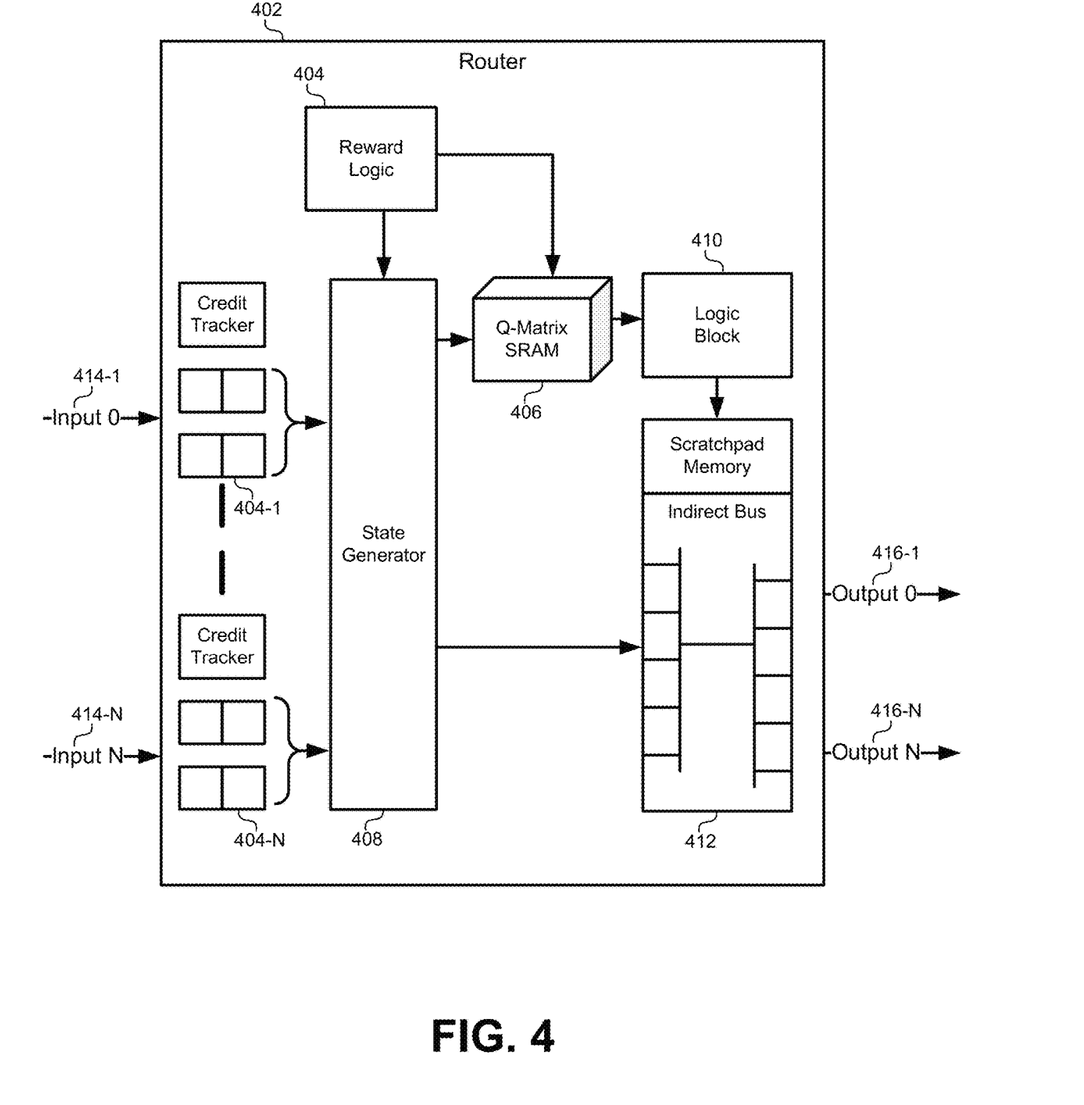
FIG. 4 illustrates an architecture for a router that uses a reinforcement learning algorithm, according to some embodiments.

FIG. 4 illustrates an architecture for a router 402 that uses a reinforcement learning algorithm, according to some embodiments. The router 402 may include a plurality of inputs 414 and a plurality of outputs 416 as described above in FIG. 3. The inputs 414 and/or outputs 416 may have physical channels that are associated with one or more virtual channels 404 that include buffers for receiving packets through the inputs 414 and/or sending packets through the outputs 416.

Instead of using a next-hop table, the router 402 may include a plurality of hardware elements that implement a reinforcement learning algorithm in the router 402. In this disclosure, a particular type of reinforcement learning algorithm known as "Q-learning" is used by way of example. Therefore, some of the hardware elements and algorithms used herein may be referred to using terminology that is specific to Q-learning, such as a Q-matrix. However, Q-learning is used only by way of example and is not meant to be limiting. Any other reinforcement learning algorithm, particularly model-less algorithms that can be trained during use, may be used as a replacement for Q-learning without restriction. Therefore, substituting Q-learning with any known reinforcement learning algorithm or their equivalents is within the scope of this disclosure.

To implement the reinforcement learning algorithm, the router 402 may include a state generator 408. The state generator 408 may receive a packet from the virtual channels 404 and determine a "state" for the packet. In traditional reinforcement learning algorithms, the state usually refers to a location in a "environment." However, this implementation defines a state in a new way such that the number of states in the system may remain static as the size of the system grows. Instead of basing the state purely on location, a state may be defined by different characteristics of the packet. For example, a state may consider a traffic class, a Quality of Service (QoS), ordering requirements, destination-to-action pairs, and so forth. Thus, a packet may be classified as having a certain state based on the packet's priority, the packet's QoS level, the datatype of the payload of the packet, a priority of the source and/or destination, and so forth. This type of state definition decouples the size of the decision space for the reinforcement learning algorithm from the size of the overall routing network. It also allows the router 402 to act independently without needing to define a state solely on its location relative to other devices in the routing network. The state generator 408 may be implemented by a lookup table that is indexed using the characteristics to define states to output a state identifier.

The state generator may be used to index a learning matrix. In the example of FIG. 4, a Q-matrix 406 may be implemented in SRAM. Each of the rows in the Q-matrix 406 may represent a state that may be generated by the state generator 408. Each of the columns in the Q-matrix 406 may represent one of the available actions that may be taken in the various states. Thus, indexing a location in the Q-matrix 406 as Q[i, j] may represent a value or weight associated with taking action(j) while in state(i). Each of the locations in the Q-matrix 406 may represent a weight or a value associated with taking a the corresponding action when in the corresponding state. Thus, the state generator 408 may provide a state to the Q-matrix 406 in order to retrieve an action from the Q-matrix 406.

In some embodiments, the Q-matrix 406 may retrieve the action having the highest corresponding weight or assigned value. This may correspond to taking the action from among the available actions that has the greatest likelihood of producing a maximum award over the course of the packet's journey through the routing network. In some embodiments, the Q-matrix 406 may forgo selecting the maximum value and may instead select a random value from amongst the available actions. This allows the router 402 to occasionally experiment with alternative routes to find undiscovered better routes through the routing network. Random values may be selected a predetermined percentage of the time (e.g., 10%), using, for example, an epsilon-greedy algorithm.

The Q-matrix 406 may effectively replace the next-hop table and/or the arbitration logic. For example, the actions associated with each column in the Q-matrix 406 may correspond to one of the cardinal directions out of the router 402. For 3D packages, this may include North, South, East, West, Up, Down, etc. Instead of storing a next-hop table that grows with the size of the system, the Q-matrix 406 may stay a static size as the system grows because the number of states and actions may remain constant regardless of network size. This solves the technical problem of the size of the next-hop table and arbitration logic that grows with system size.

Reward logic 404 may be used to drive the unsupervised learning of the reinforcement learning algorithm. Instead of using separate training and inference modes, the weights in the Q-matrix 406 can be set using rewards calculated by the reward logic 404. As described in detail below, the reward logic 404 may receive a global reward that corresponds to the overall route between the source and the destination. The reward logic 404 may also calculate a local reward that corresponds to the immediate decision of which direction to send the packet from the router 402. These two rewards can be combined into a reward value that is used to update the weights for each action in the Q-matrix 406. As used herein, the term "reward" may refer to a numerical value that is used in an equation described below to update the weights in the Q-matrix 406. The final calculated reward may be used in the reinforcement learning algorithm.

A logic block 410 may include digital logic circuits or a microcontroller that performs mathematical operations using the output of the Q-matrix 406. For example, some embodiments may represent other actions in the Q-matrix 406 rather than the next direction for the packet to be routed. These other actions can be translated by the logic block 410 into a timing and direction for the corresponding input to be routed to the corresponding output. Additionally, the logic block 410 may update the weight or value associated with the action based on the current reward. For example, equation (1) below illustrates one method of updating a Q value for an action.

$$Q_{new}(s_t, a_t) = (1 - \alpha)Q(s_t, a_t) + \alpha \left(r_t + \gamma \max_a Q(s_{t+1}, a)\right) \qquad (1)$$

Where $s_t$ and $s_{t+1}$ are the current and next state of the router 402, $a_t$ and $a_{t+1}$ are the current and next action chosen by the router using the Q-matrix, $\gamma$ is a discount factor between 0 and 1 that defines how much the router 402 should take into account the long-run rewards instead of immediate rewards, $\alpha$ is a learning rate factor between 0 and 1 that determines how strongly the new Q-value should replace the previous Q-value, and $r_t$ is the current reward value for this location based on the combined global and local rewards. As described below, the current reward value $r_t$ maybe updated using a local reward that is recalculated on each iteration.

Figure 5:
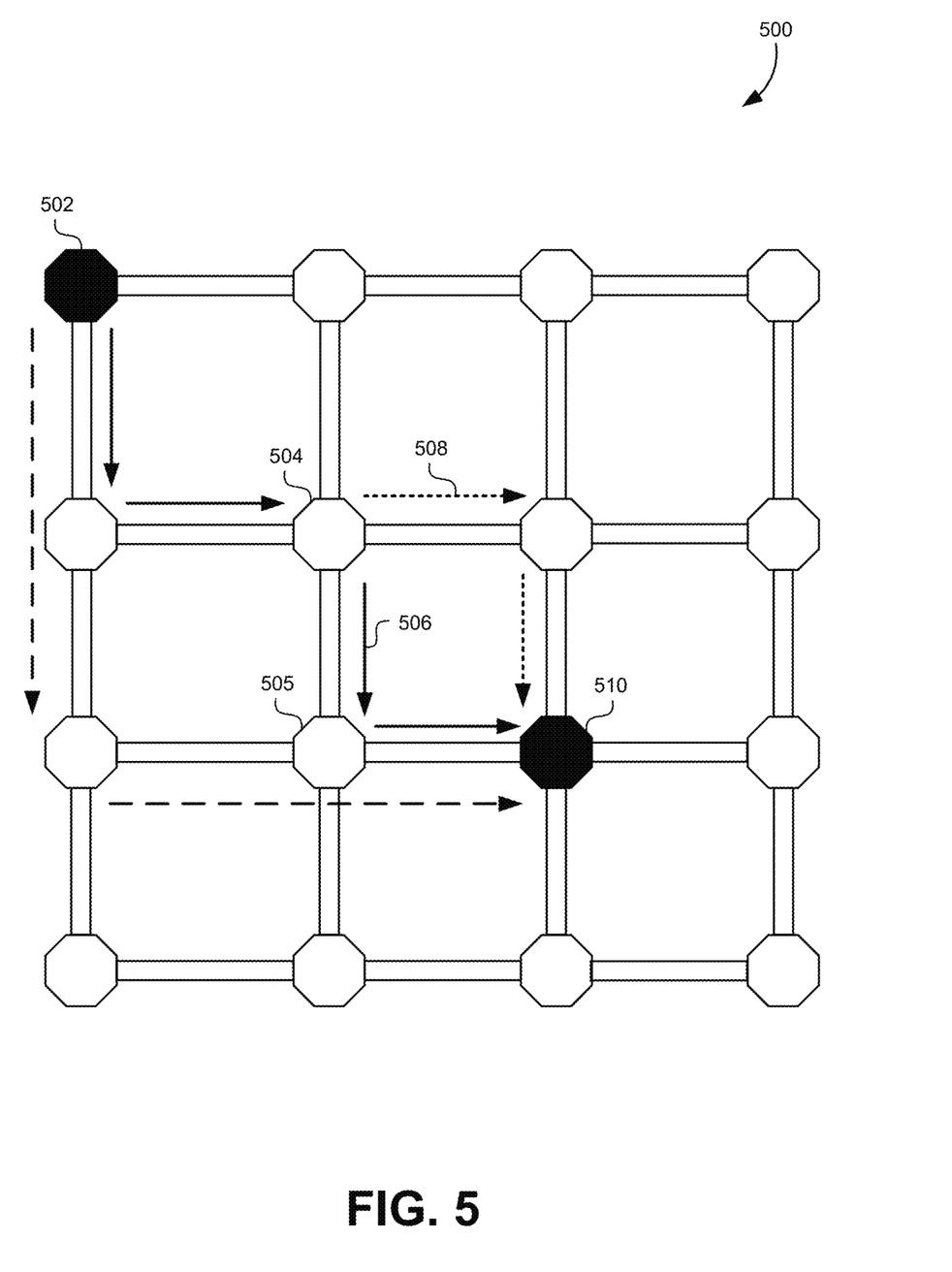
FIG. 5 illustrates an example of how a global route can be modified using a local reward to avoid local bottlenecks from a particular router, according to some embodiments.

FIG. 5 illustrates an example of how a global route can be modified using a local reward to avoid local bottlenecks from a particular router, according to some embodiments. A global reward may be used to calculate a most efficient route from the perspective of the routing network as a whole. For example, the global reward may generate numerical values that produce positive rewards when following path 506 between a source 502 and a destination 510. This global reward may be broadcast out to each of the routers in the routing network. For example, router 506 may include a global reward component that incentivizes (e.g., has a positive reward value) routing along path 506, and that disincentives other paths.

If the global reward were followed entirely by the router 504, every packet from the source 502 to the destination 510 would follow the same path 506. However, this global reward does not address any temporary, local bottlenecks along path 506. For example, a number of different paths between different sources and destinations may travel between router 504 and router 505 using a portion of the same route as path 506. Although path 506 may be the most efficient route from the global perspective, traffic may temporarily congregate along the route between router 504 and router 505 from a number of different global routes that use this segment. Thus, this temporary, local bottleneck may form that causes the global path 506 to no longer be an optimal route.

To address this, some embodiments may use a local reward that is maintained individually by each router that captures the action or direction of travel by the packet along with its score. This local reward value may be based on any metric that can be measured locally at the router. For example, some embodiments may measure a number of cycles during which a packet waits at the router 504 before being allowed to continue on path 506. Other examples of local rewards may include measuring latency, throughput, the ability to prioritize packets and meet a QoS metric, and so forth. As the metric measured for the local reward changes, the local reward may be recalculated and updated. For example, the local reward may become more negative for actions that follow path 506 when the delay time waiting for an open channel on path 506 exceeds a threshold. The rewards may become less negative or more positive for actions that send the packet away from the local bottleneck on path 506 down another route.

It should be noted that the recalculation of the local award at each router can take place during operation of the routing network. Instead of learning a single best route using a global reward that does not change after an initial optimization period is over, the system can continuously learn the most optimal route and overcome dynamic bottlenecks that rise and dissipate during operation. Each local router can combine the global reward that is broadcast for the route with the individual local reward calculated at the router. This combined reward may then be used to update the Q-matrix after each action is taken. Over time, each individual routing element "learns" a most optimal current route for each class of packet. As traffic patterns and workload behaviors change, the self-learning algorithm adapts the routing function based on both the global and local reward schemes. Combining these two rewards may include performing a weighted combination, an average, or other mathematical combination of these two rewards in various embodiments to form the final reward.

Figure 6:
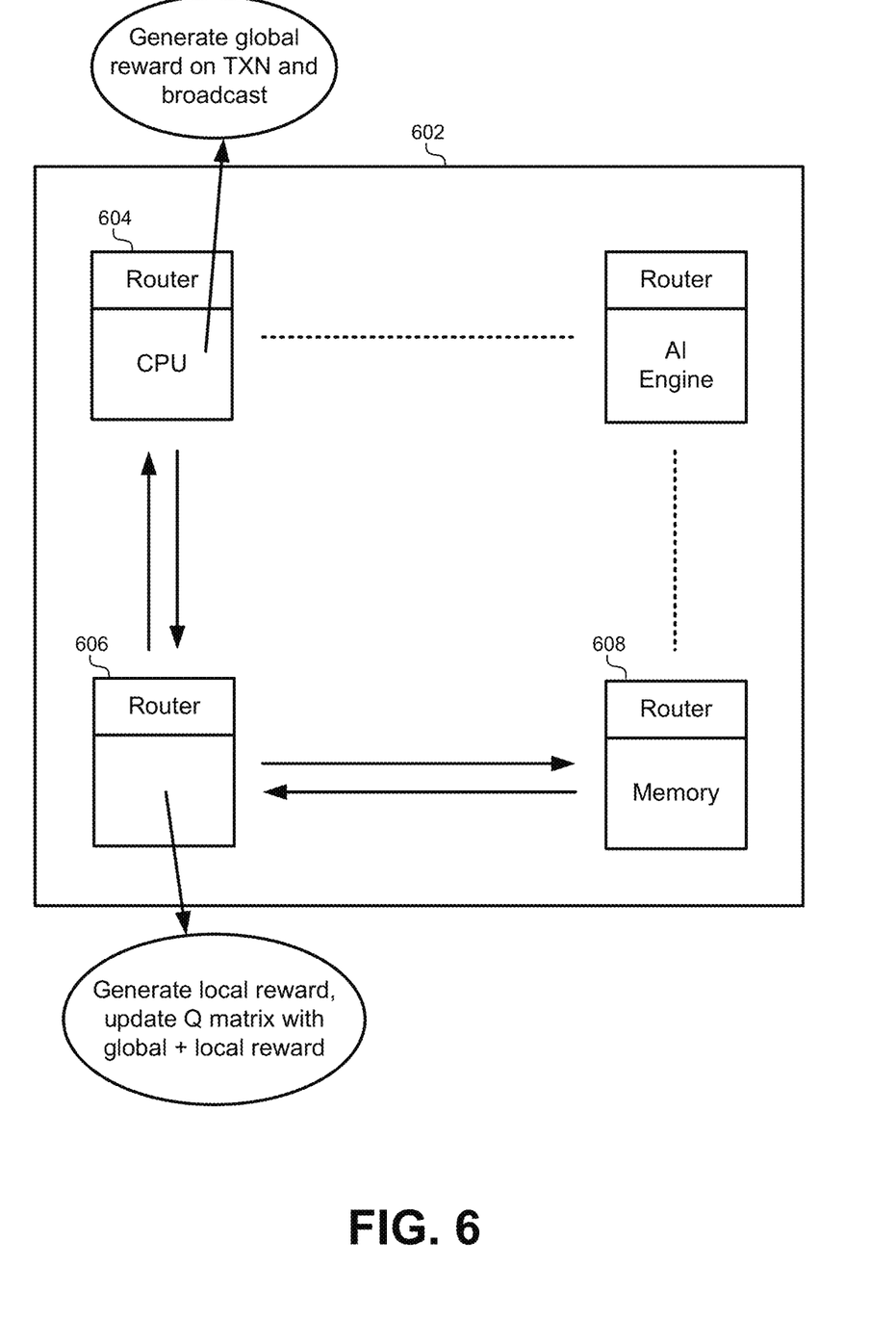
FIG. 6 illustrates how a global reward can be communicated and interact with a local reward, according to some embodiments.

FIG. 6 illustrates how a global reward can be communicated and interact with a local reward, according to some embodiments. Unlike traditional reinforcement learning algorithms or neural networks that initialize their learning matrices to "0" weights, some embodiments may use non-zero initial weights as a static routing policy. This ensures that initial packages through the routing network can be routed and are not dropped. The Q-matrix can begin with the initial weights and update these weights when a superior route is found at each router node. This ensures that initial packages are not dropped or lost in the network as the learning algorithm explores the routing network to find optimal routes. This also provides a static fallback or failsafe solution. These initial weights may be based on service level agreements to ensure that different packet types are transmitted in accordance with their required level of service. These initial weights may also define a optimal route that includes a fewest number of hops between the source and the destination.

In this example, a global reward can be calculated based on the optimal path with the source and the destination. The router 604 can calculate the global reward for each router along the route and broadcast the global reward out to each router. In this example, this may include broadcasting the global reward to intermediate router 606, and the router 606 can update its Q-matrix weights using the global reward. When the global reward is received, each router in the pathway between the source and the destination may update the Q-matrix with the global reward for that destination. When the packet is received by the router 606 as it is being transmitted towards the destination router 608, the local rewards can be calculated at the router 606 for each action. This allows the reinforcement learning algorithm to adapt to local traffic for router 606 while still incorporating the global reward for the overall route.

Figure 7A:
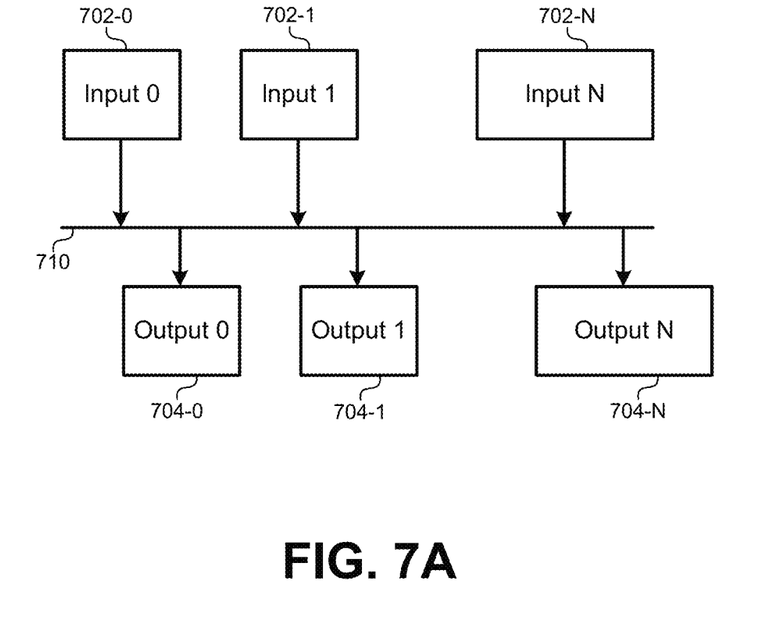
FIG. 7A illustrates an alternative to the crossbar array used in previous routers, according some embodiments.

FIG. 7A illustrates an alternative to the crossbar array used in previous routers, according some embodiments. As described above, the crossbar array grows exponentially with the number of ports on the router. While crossbar arrays offer a high level of interconnectivity between inputs and outputs on the router, they are not efficiently used. It can be shown that the different routes within a crossbar array have an average utilization of less than 30%. However, because of the inefficiency of using the next-hop table and arbitration logic described above, the crossbar array has been deemed necessary in order to provide an exhaustive level of connections between the inputs and outputs in different directions on the router.

Figure 7B:
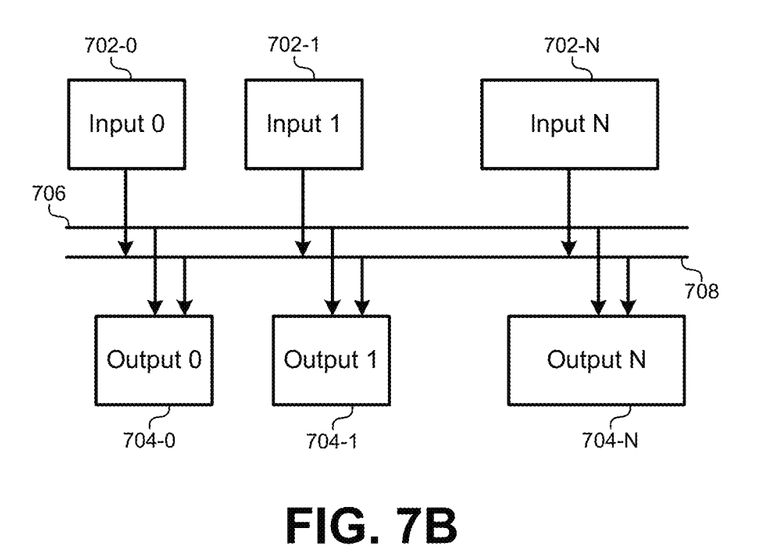
FIG. 7B illustrates another indirect bus design having multiple buses that can be optimized, according to some embodiments.

Turning back briefly to FIG. 4, the crossbar array may be replaced with an indirect bus 412. As used herein, the term "direct" may be used to refer to a crossbar array or other topology that allows one-to-one connections between multiple inputs and outputs. In contrast, the term "indirect" may be used to refer to buses that are shared between inputs and outputs that are used by one connection at a time per bus. In previous router systems that did not use the reinforcement learning algorithm described herein, the crossbar array was a necessary element to provide full connectivity. However, the reinforcement learning algorithm has been shown to be much more efficient in routing traffic internally within the router. Therefore, an indirect bus as illustrated in FIG. 7A may be used instead of the crossbar array. Specifically, the efficiency of the routing decisions made by the reinforcement learning algorithm can maximize the utilization of an indirect bus 710 to coordinate traffic between the inputs 702 and the outputs 704. The reinforcement learning algorithm can adapt to the topology of the bus 710 to utilize it efficiently. Thus, even though there are fewer connections on the bus 710, the efficiency with which traffic is routed through the bus is able to replace the larger and more costly crossbar array. FIG. 7B illustrates another indirect bus design having multiple buses 706, 708 that can be optimized under this same principle. Other examples of indirect buses or other replacements for the crossbar array may include time-series based networks (e.g., LSTM, Attention), which may be supported to predict a next packet in a sequence to significantly reduce arbitration complexities. Indirect networks can be configured based on the predicted next packet to reduce buffer requirements and path latency.

Figure 8:
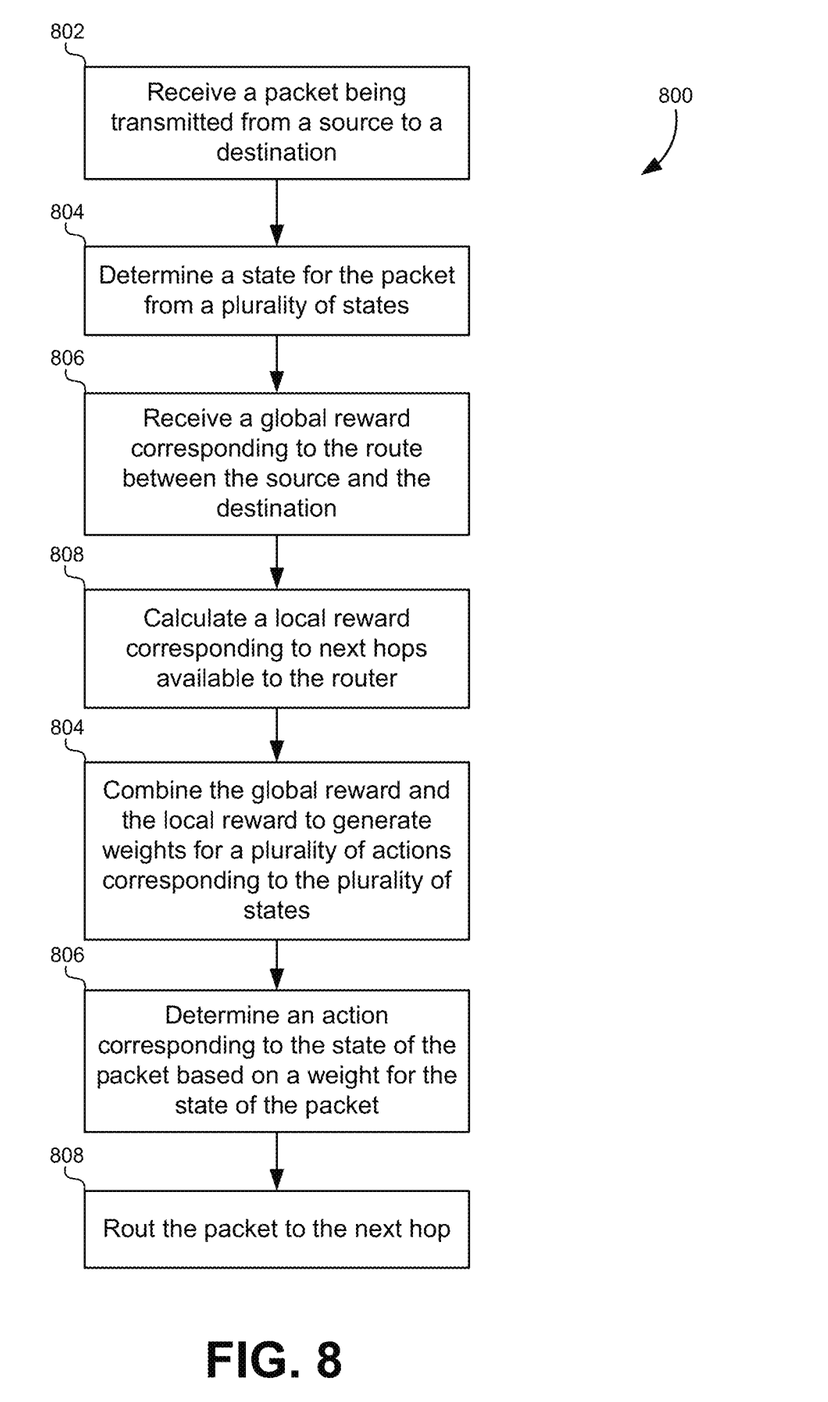
FIG. 8 illustrates a flowchart of a method of determining next hops for packets received by routers.

FIG. 8 illustrates a flowchart of a method of determining next hops for packets received by routers. The method may be carried out by the router illustrated above in FIG. 4. These operations may use a reinforcement learning algorithm implemented in hardware or software in the router. When implemented in software, some embodiments may cause these operations to be executed by one or more processors based on instructions stored on one or more memory devices or on a non-transitory computer-readable medium.

The method may include receiving a packet being transmitted from a source to a destination (802). The packet may be transmitted from a source, such as a chiplet or subsystem in an SoC. The packet may include a header that stores the source/destination information. The packet may be received on a physical channel associated with one or more virtual channels. The packet may be transmitted through a NoPK or an NoC system.

The method may also include determining a state for the packet from a plurality of states (804). In some embodiments, the state determination need not use the location or sequence of the router as the state. Instead, some embodiments may use factors such as a priority level for the packet, a QoS level for the packet, a data type for the packet, a payload type for the packet, a payload value for the packet, a current latency of the packet as it is being transmitted from the source to the destination, a size of the packet, and/or other factors. The number of states may be decoupled from the number of chiplets or systems available as endpoints in the system. The number of states may also be decoupled from the number of ports on the router. In other words, some embodiments may determine a state independently from a number of endpoints or ports. Generally, the number of states does not change when the number of endpoints or ports increases or decreases.

The method may additionally include receiving a global reward corresponding to the route between the source and the destination (806). The global reward may be calculated for the route between the source and the destination. The global reward may include rewards or punishments that produce an optimal path between the source and the destination assuming no temporary or local bottlenecks are encountered. The global reward may be broadcast to the router, and the global reward may be used to recalculate weights for a learning or reinforcement matrix, such as a Q-matrix.

The method may further include calculating a local reward corresponding to next hops available to the router (808). The local reward may include a value that is calculated based on local metrics, such as a local number of cycles or delay associated with the packet or a destination. The local reward may be responsive to local bottlenecks, and the influence of the local reward may cause the original route between the source and destination to be rerouted to avoid a local bottleneck. The local reward may be recalculated after each action is performed, and the Q matrix may be updated accordingly. This allows the local reward to constantly learn and adjust to find a best route locally around bottlenecks.

The method may also include combining the global reward and the local reward to generate weights for a plurality of actions corresponding to the plurality of states (810). Combining the two rewards may include creating a weighted combination, an average, or any other mathematical combination of the two values to generate an overall reward for an action.

The method may additionally include determining an action corresponding to the state of the packet based on a weight for the state of the packet (812). The action may indicate a next hop in a route between the source and the destination, such as North, South, East, West, Up, Down, and so forth. Selecting the appropriate action may include selecting an action for a given state of the packet that has the highest weight. Other embodiments may randomly choose an action on occasion to explore other routes. The method may further include routing the packet to the next hop (814).

It should be appreciated that the specific steps illustrated in FIG. 8 provide particular methods of determining next hops for packets received by routers according to various embodiments. Other sequences of steps may also be performed according to alternative embodiments. For example, alternative embodiments may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. Many variations, modifications, and alternatives also fall within the scope of this disclosure.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A router comprising:
a plurality of input buffers configured to receive a packet being transmitted from a source to a destination;
a state generator configured to determine a state for the packet from a plurality of states;
a memory storing weights for a plurality of actions corresponding to the plurality of states, wherein the memory is configured to return an action corresponding to the state of the packet, and the action represents a direction of a next hop from the router in a route between the source and the destination based on the weights;
reward logic configured to generate the weights for the plurality of actions in the memory, wherein the reward logic is configured to:
receive a global reward corresponding to the route between the source and the destination;
calculate local rewards corresponding to each of the next hops available to the router; and
combine the global rewards and the local rewards to update the weights for the plurality of actions in the memory; and
an indirect bus that routes the packet between the input buffers and outputs for the next hops available to the router.

2. The router of claim 1, further comprising an indirect bus connecting the plurality of input buffers to a plurality of output buffers.

3. The router of claim 2, wherein the indirect bus does not include a crossbar array.

4. The router of claim 1, wherein the router is part of a Network on Package (NoPK), and the source and destination comprise chiplets.

5. The router of claim 1, wherein the router is part of a Network on Chip, and the source and destination comprise subsystems on a System on a Chip (SoC).

6. The router of claim 1, wherein the memory comprises a static random access memory (SRAM) storing Q-matrix for a Q-learning algorithm.

7. The router of claim 1, wherein combining the global reward and the local rewards to generate the weights for the plurality of actions comprises using a weighted combination of the global reward and the local reward for each action.

8. The router of claim 1, wherein the global reward includes values that punish or reward next hops for routers based on an optimal path between the source and the destination.

9. The router of claim 1, wherein the local rewards include values that are updated to reflect a local bottleneck observed by the router.

10. The router of claim 1, wherein combining the global reward and the local rewards causes a next hop for the packet to change to avoid a local bottleneck.

11. A method of determining next hops for packets received by routers, the method comprising:
   receiving, at a router, a packet being transmitted from a source to a destination;
   determining, at the router, a state for the packet from a plurality of states;
   receiving, at the router, a global reward corresponding to the route between the source and the destination;
   calculating, at the router, local rewards corresponding to each next hop available to the router;
   combining, at the router, the global reward and the local reward to generate weights for a plurality of actions corresponding to the plurality of states;
   determining, at the router, an action corresponding to the state of the packet based on weights of a plurality of actions for the state of the packet, wherein the action selects a direction of a next hop in a route between the source and the destination; and
   routing the packet to the next hop through an indirect bus between inputs and outputs of the router.

12. The method of claim 11, wherein routing the packet to the next hop comprises routing the packet through the indirect bus that does not include a crossbar array.

13. The method of claim 11, wherein the global reward includes values that punish or reward next hops for routers based on an optimal path between the source and the destination.

14. The method of claim 11, wherein the local rewards include values that are updated to reflect a local bottleneck observed by the router.

15. The method of claim 11, wherein combining the global reward and the local rewards causes a next hop for the packet to change to avoid a local bottleneck.

16. A router comprising:
   a plurality of input buffers configured to receive a packet being transmitted from a source to a destination;
   circuitry implementing a reinforcement learning algorithm that determines a state of the packet and selects a corresponding action indicating a next hop for the packet, wherein the reinforcement learning algorithm combines a global reward corresponding to the route between the source and the destination and local rewards corresponding to each of the directions of next hops available to the router;
   a plurality of output buffers configured to receive the packet and route the packet to the next hop selected by the reinforcement learning algorithm based on the state of the packet and
   an indirect bus that routes the packet between inputs and outputs for the next hops available to the router.

17. The router of claim 16, wherein the reinforcement learning algorithm comprises a Q-learning algorithm.

18. The router of claim 16, wherein the reinforcement learning algorithm updates a weight assigned to the action based on a discount factor that weights long- run rewards versus immediate rewards.

19. The router of claim 16, wherein the reinforcement learning algorithm updates a weight assigned to the action based on a learning rate factor that weights a new weight versus a previous weight.

20. The router of claim 16, further comprising an indirect bus that does not use a crossbar array between the plurality of input buffers and a plurality of output buffers.

* * * * *